Figure 1:
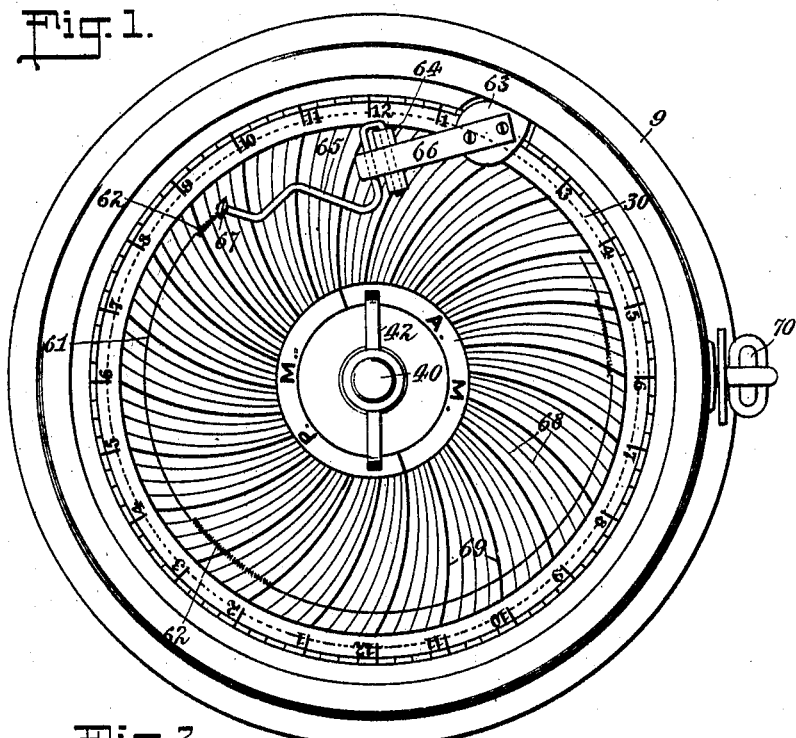

C. W. NIEMAN.
RECORDING DEVICE.
APPLICATION FILED MAY 16, 1914.

1,151,120.

Patented Aug. 24, 1915.
2 SHEETS—SHEET 1.

WITNESSES
George E. Cook.
Walton Harrison.

INVENTOR
Chauncy W. Nieman
BY George Burk
ATTORNEY

C. W. NIEMAN.
RECORDING DEVICE.
APPLICATION FILED MAY 16, 1914.
1,151,120.
Patented Aug. 24, 1915.
2 SHEETS—SHEET 2.
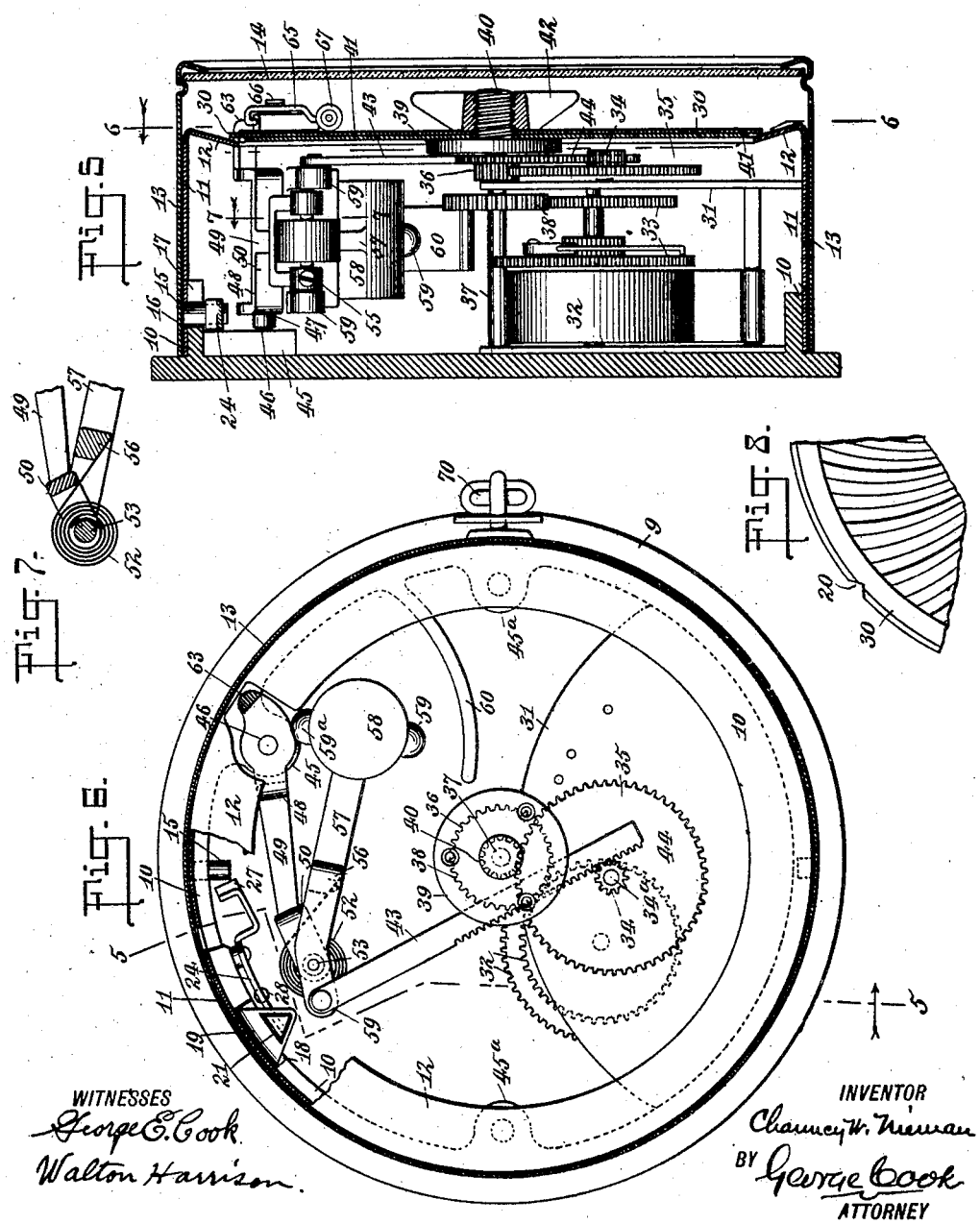
WITNESSES
George E. Cook.
Walton Harrison.
INVENTOR
Chauncey W. Nieman
BY George Cook
ATTORNEY

UNITED STATES PATENT OFFICE.

CHAUNCY W. NIEMAN, OF NEW YORK, N. Y.

RECORDING DEVICE.

1,151,120.

Specification of Letters Patent.

Patented Aug. 24, 1915.

Application filed May 16, 1914. Serial No. 838,931.

*To all whom it may concern:*

Be it known that I, CHAUNCY W. NIEMAN, a citizen of the United States, and a resident of New York, borough of Manhattan, in the county of New York and State of New York, have made and invented certain new and useful Improvements in Recording Devices, of which the following is a specification.

This invention relates to recording devices, and more particularly to shock recorders suitable for use upon vehicles, such for instance as automobiles, for the purpose of making records disclosing the time periods during which the vehicle is in use, or at least for indicating, in terms of time, the commencement, duration and ending of the various periods during which the vehicle is subjected to vibrations of the kind peculiar to road travel.

The invention contemplates the use of a record chart and a marking stylus, and in connection therewith an inertia-held member carried by the vehicle and relatively to which the vehicle body is movable within certain limits; also a number of levers and other movable parts collectively constituting a reducing gear extending from the inertia-held member to the stylus for the purpose of controlling the stylus, the arrangement being such that the record mark made by the stylus has a noticeable zigzag character so long as the vehicle is subjected to the shocks and jars peculiar to road travel, but is to all intents and purposes a practically smooth line while the vehicle is at a standstill, even though the vehicle body is subjected to slight rythmic vibrations due to the idle running of the engine.

The invention likewise comprehends a special aggroupment of the movable parts for controlling the marking stylus, whereby said parts and said stylus are especially adapted for making a record line having the general form of a spiral, thus enabling a single record chart to be used for a comparatively long time.

Another object sought to be accomplished by the invention is the provision of an improved marking stylus carrying a revoluble marking disk which, by its rotation, maintains a constantly changing contact surface in engagement with the record chart in order to distribute the wear upon the marking disk.

A further purpose of the invention is to arrange the various levers and other parts of the reducing gear connecting the inertia-held member with the marking stylus that, while movements of the vehicle body relatively to the inertia-held member are transmitted through the reducing gear to the marking stylus, the bodily movements of the stylus relatively to the record chart, due to the cause in question, are comparatively small, and as a consequence the friction of the stylus upon the record chart is greatly reduced and the sensitiveness of the mechanism correspondingly increased.

The invention also contemplates the use, in connection with a recorder of the kind under discussion, of a telltale device for disclosing the unauthorized removal of the record chart from the casing, and for revealing the precise time at which such unauthorized removal of said record chart takes place.

Various other objects, sought to be accomplished by the invention, appear below in connection with the detailed description of the apparatus.

Reference is made to the accompanying drawings forming a part of this specification, and in which like letters indicate like parts.

Figure 2:
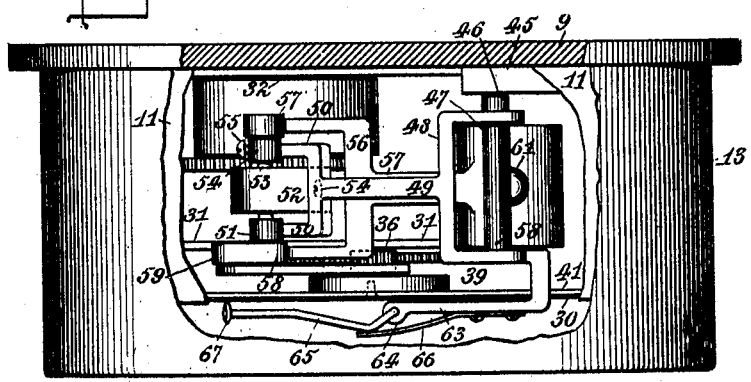
Figure 3:
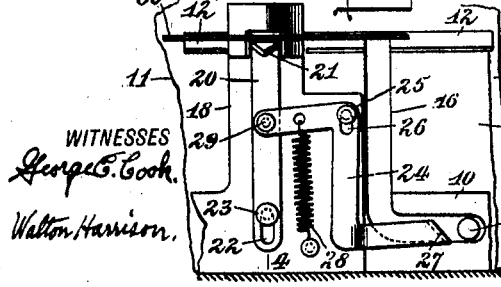
Figure 4:
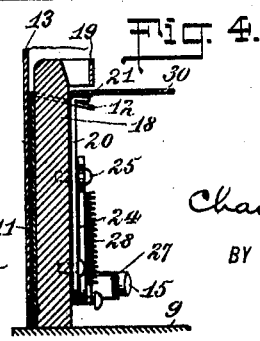

Figure 1 is a front elevation of the shock recorder. Fig. 2 is a top view of the same, certain parts being broken away. Fig. 3 is a detail view, showing in fragmentary elevation the telltale device for recording and disclosing the removal of the record chart. Fig. 4 is a section, on the line 4—4 of Fig. 2, looking in the direction of the arrow. Fig. 5 is a central vertical section through the shock recorder. Fig. 6 is a vertical cross section, on the line 6—6 of Fig. 5, looking in the direction of the arrow. Fig. 7 is a detail view, showing in section the spring for supporting the inertia-held lever. Fig. 8 is a detail view, showing in fragmentary elevation a portion of a record chart as cut with a notch, and thus indicating that the chart has been removed from the casing.

A massive disk 9 serves as the back wall of the instrument, and in this instance is disposed vertically. Carried by the back 9 and integral with it is an annular flange 10. An inner casing is shown at 11 and has a general annular form. This inner casing is provided with an inwardly extending flange 12. An outer casing 13, having a general annular form, is fitted telescopically upon the inner casing 11. The outer casing carries a glass plate 14, serving as a window through which readings may be made. Mounted rigidly upon the outer casing 13, and extending radially inward therefrom, is a locking pin 15. This locking pin extends through two bayonet slots 16, 17 with which the inner casing 11 and the flange 10 are provided, the two bayonet slots being in registry with each other, and thus constituting practically a single bayonet slot. The outer casing may be disengaged from the inner casing 11 and parts secured to the latter, by turning the outer casing relatively to the inner casing, and then pulling the outer casing bodily away from the inner casing. The flange 10 is provided with an extending portion 18 integral with it, and mounted upon this extending portion is a punch die 19. A punch plunger is shown at 20 and is provided with a cutter head 21 for coacting with the punch die 19, the punch die and punch plunger together constituting a punch for mutilating the record chart, as hereinafter described. The punch plunger 20 has the form indicated more particularly in Figs. 3 and 4. It is provided with a guiding slot 22, and extending through the latter is a stationary guiding bolt 23. A lever 24, having substantially a Z-form, is mounted upon a pivot bolt 25, which extends through a slot 26 in the lever, this slot also serving to compensate for lost motion due to rocking movement of the lever, as may be understood from Fig. 3. The lever 24 is provided with a bevel end 27, to be engaged by the locking pin 15, as the latter moves along the bayonet slot whenever the outer casing 13 is turned relatively to the inner surface 11 in order to remove the outer casing. A spring 28 is connected with the lever 24 and with the flange 10, for the purpose of normally holding the lever 24 in a predetermined position, as indicated in Fig. 3. One end of the lever 24 is connected by a pivot pin 29 with the punch plunger 20, for the purpose of enabling the lever to actuate the plunger.

A record chart is shown at 30, and has a circular form. The outer edge of the chart extends out between the cutter head 20 and the punch die 19. If, now, the outer casing be removed, and the Z-shaped lever 24 be consequently actuated, as above described, the punch plunger 20 moves in the general direction of its length so that the cutter head 21 punches a V-shaped notch in the outer edge of the record chart.

Mounted within the inner casing 11 is a skeleton frame 31, and located within this frame is a mainspring 32 and a train of clockwork 33 driven by this mainspring. A pinion 34 and a gear wheel 35 are mounted rigidly upon a revoluble shaft 34ª, the latter forming a part of the clockwork and being actuated thereby. The gear wheel 35 meshes with a cannon pinion 36, the latter being mounted rigidly upon a revoluble shaft 37 which also carries a gear wheel 38, the latter being secured rigidly upon it, and driven directly by the clockwork. The shaft 37, with the gear wheel 38 and cannon pinion 36, turns at the rate of one revolution for every twenty-four hours, and the parts are so proportioned and the spring 32 is of such length that the clockwork will run continuously for eight days and nights without rewinding. As the pinion 36 turns very slowly, it drives the gear wheel 35 at a still slower rate, and consequently the pinion 34, which is rigid relatively to the gear wheel 35, has a rate of rotation considerably slower than that of the pinion 36. Mounted rigidly upon the revoluble shaft 37 is a button 39, and extending from this button is a threaded boss 40. Engaging the button 39 is a disk 41. A wing nut 42 is threaded internally and fitted upon the threaded boss 40 so as to clamp the record chart 30 firmly against the disk 41, this disk and the record chart, thus clamped, being turned by the shaft 37 at a rate of one revolution in twenty-four hours. In order to set the chart 30—that is, in order to have a particular point, carried by the chart, located in a particular position at a definite time, the wing nut 42 is loosened, the chart 30 is adjusted by turning it to the extent desired, and the wing nut is then tightened so as to grip the middle portion of the chart. The nut may be removed entirely, the chart taken out and replaced by a new one, and the nut then put back in position.

A rack bar 43 is disposed tangentially in relation to the pinion 34, and is provided with rack teeth 44 which mesh with this pinion, and as the pinion in question has a very slow rate of rotation, the rack bar 43 is drawn obliquely downward to the right according to Fig. 6, at a very slow rate of travel, the length of the toothed portion of the rack bar representing the proximate distance traveled by the rack bar during the entire time the clockwork can run without the mainspring being rewound.

The flange 10 is provided with ears 45, 45ª which are used to support various parts. Extending laterally from the ear 45 is a pivot pin 46, and mounted upon the latter, and loose relatively to the same, is a bearing sleeve 47. Mounted rigidly upon this bearing sleeve is a fork 48, constituting part of a lever 49. This lever is provided with another fork 50, and is adapted to swing upon the pivot pin 46 as a center. The fork 50 is provided with bearings 51, and extending through these bearings is a pivot pin 53. A spiral spring 52 encircles this pin and is secured at one of its ends to the same, its other end being secured to the fork 50 by a fastening 54. A screw 55 is used for holding the pivot pin 53 rigid relatively to the fork 50, and for enabling the tension of the spring 52 to be adjusted by loosening the pin 53, turning the same relatively to the fork 50, and then tightening the pin relatively to this fork.

A lever 57 is provided at one of its ends with a fork 56, the latter being pivotally secured upon the pin 53 and normally maintained in a substantially horizontal position, as indicated in Fig. 6, by a weight 58 which is mounted upon the free end of the lever. The weight 58 is provided, at its bottom, with a rubber buffer 58$^a$, and below this rubber buffer is a tongue 60 integral with the flange 10, and constituting a stop for limiting the travel of the weight in a downward direction. The weight 58 also carries a buffer 59$^a$, which lodges against the ear 45, the latter thus serving as a limiting stop for preventing excessive upward travel of the weight.

The lever 49 carries an arm 63 extending out over the top of the record chart and obliquely across a portion of the outer face of the latter, as indicated in Fig. 2, the arm being provided with a bearing 64. A stylus 65 is pivotally mounted within this bearing, and is engaged by a leaf spring 66 carried by the arm 63. The stylus 65, at its outer or free end, carries a marker wheel 67, this wheel having a sharp edge and being made of alloy suitable for the purpose of rubbing off slightly and thus marking the chart.

I find that ordinary soft solder is a suitable material from which to form a marker wheel. The record chart is metallized or treated in accordance with known principles in this art, for the purpose of rendering it sensitive to markings made by the marker wheel.

At 70, in Fig. 8, is shown a notch in the record chart, as made by the punch when the record chart is removed, as above described. Each time the casing is opened, a notch is cut in the record chart by the punch, as above described. Moreover, the exact time when the notch is cut is disclosed by the position of the notch relative to the chart, so that the punch mechanism operates as a telltale for disclosing when and how often the chart has been taken out.

While the instrument is capable of running eight days it is desirable, in practice, that the spring be wound once a week—thus following the analogy of operating an eight-day clock. The record chart thus makes ordinarily seven revolutions, and never exceeding eight revolutions, after each rewinding of the mainspring. The marker wheel 67 thus has a tendency to make a spiral mark 71 which begins at a point near the peripheral edge of the record chart, and ends at a point comparatively near the middle of the chart. By the general spiral form of the record line a comparatively long line may be placed upon a record chart of small size. The record chart is provided with numerical legends indicating the hours of the day and night, and also with legends A. M. and P. M. indicating general subdivisions of the day and night.

The record line shows as a thin, narrow spiral line when the recorder is not subjected to any shocks or jars, such as it invariably receives when subjected to road travel. When, however, it receives such shocks or jars, the weight 58 causes the lever 57 to swing vertically upon the fork 50, and the lever 59 also swings vertically but in much less angular degree, upon the pin 46 as a center. Hence, the stylus 65 is moved vertically along lines which are of arcuate form though very short, and are indicated at 62, producing a series of sharp zig-zags which practically constitute a solid broad line. For the purposes of locating these lines and of reducing them to terms of time, I employ a set of permanent markings 68, interspersed with heavier markings 69, these markings all having the form of arcuate curves as indicated in Fig. 1. It is also found that, with the parts arranged as above described, the rythmic vibration due to the idle running of the engine, the vehicle being stationary, the weight 58 is not materially affected, and the record line made by the marker wheel is scarcely visible. In the first place, the weight 58 being mounted upon what is essentially a compound lever and balanced by the spring 52, does not readily adapt itself to the frequency of the extremely rapid vibrations due to the idle strokes of the engine. Again, as the path of travel of the weight 58 is lengthy as compared with the path of travel of the marking end of the stylus, the record line made by the stylus does not disclose any noticeable characteristics due entirely to the engine vibrations. Such being the case, the complete record line indicates distinctly the periods of time during which the vehicle has been running, and also indicates the periods of idleness of the vehicle so as to avoid all question as to their distinction from the periods during which the vehicle has been traveling.

It will be noted that as the rack bar 43 is drawn obliquely downward, the position of the pivot pin 59 is gradually shifted, and as this pin serves as a fulcrum for the lever 57, it follows that the fulcrum of this lever gradually moves in the same general direction as the rack bar 43. Such being the case, the lever 49 swings or rocks slowly downward upon the pin 46 as a center, and as the arm 63 also swings upon the same pin 46 as a center, it follows that the marker wheel 67 moves downwardly in the ark of a circle of which the center is the pin 46. The marker wheel, thus engaging the outer face of the record chart, is thus always in close proximity to the pin 59 whatever may be the bodily movements of this pin. The rotation of the record chart, crossed by a movement of the marker wheel 67, as just described, gives the proximate general form of a spiral to the path of travel of the marker wheel relatively to the rotating record chart. This arrangement enables a single chart to make several revolutions before being used up, so that the instrument may run for a considerable length of time without the necessity for changing the record chart, as elsewhere described. Moreover, this arrangement of the parts enables the mechanism as a whole to be built quite compactly as the arm 63, by hooking over the outer edge of the record chart, enables the pivot pin 46 to be placed close to the adjacent edge of the record chart and thus economizing room.

The stylus arm has a rocking movement, the angular extent of which is the same as the rocking movement of the lever 49, and the degree of rocking movement made by this arm is controlled by bodily movements of the lever 57 which is under control of the inertia-held weight 58. As the portion of the lever 57 between the weight 58 and the pin 53 is several times longer than the distance between the pins 53 and 59, and as the lever 57 is fulcrumed upon the pin 59, it appears that the angular movement of the lever 49, and consequently of the stylus arm, is relatively small as compared with the angular movement of the lever 57. Therefore, the movements of the weight 58 relatively to the vehicle, or strictly speaking, the movements of the vehicle relatively to the weight 58, when transmitted through the levers 57 and 49 and arm 63 to the marker wheel 67, are greatly reduced in amplitude. I find that the reduction in amplitude can easily be made six to one or even seven or eight to one. This being the case, the swinging movements of the marker wheel 67 relatively to the record chart are so greatly reduced in amplitude that the record mark appears practically as a smooth line when no influence is brought to bear upon the vehicle except the vibrations of the vehicle body due to the idle running of the engine while the vehicle is standing still. When, however, owing to the travel of the vehicle upon the roadway, the vehicle body is subjected to motions of greater amplitude than while the engine is standing still, the marker wheel records such motions by making a zigzag indication, clearly noticeable to the eye. Therefore, the complete spiral record line made during the operation of the instrument, indicates distinctly the duration and extent of the periods during which the vehicle has been running and the periods during which it has not been running, upon the road.

The fact that the levers 57 and 49 and parts immediately associated therewith, together constituting a reducing gear for transmitting motions from the vehicle body to the marker wheel, presents another advantage. The movement of the marker wheel relatively to the record chart being thus reduced to a minimum, the friction of the marker wheel against the record chart is correspondingly increased, and the sensitiveness of the marking stylus—indeed the sensitiveness of the indicator as a whole— is correspondingly increased. The accuracy of the indications, therefore, is enhanced by virtue of the fact that the mechanism for transmitting motions of the vehicle body to the marker wheel operates as a reducing gear.

The invention is not limited to the precise construction shown and illustrated, as the mechanism may be varied without departing from the spirit of the invention, which is defined by the claims.

The invention having been thus described, the subject matter claimed is as follows:

1. In a shock recorder, the combination of a frame to be subjected to shocks, a lever journaled upon said frame, a stylus connected with said lever, a record chart disposed adjacent the path of travel of said stylus, a second lever, a pivotal support therefor, said second lever pivotally connected with said first mentioned lever, and an inertia-held weight carried by said second mentioned lever.

2. In a shock recorder, the combination of a frame to be subjected to shocks, a lever pivotally mounted upon said frame, a second lever, a pivotal support therefor, said second lever pivotally connected with said first mentioned lever, an inertia-held weight carried by said second mentioned lever, a spring connected with said second mentioned lever and with some object extraneous to said second mentioned lever for the purpose of normally balancing said weight, and a stylus connected with said first mentioned lever and controllable thereby.

3. In a shock recorder, the combination of a frame to be subjected to shocks, a lever journaled upon said frame, a second lever pivotally connected with said first mentioned lever, a movable member to which said second mentioned lever is journaled so as to serve as a fulcrum for said second mentioned lever, means for slowly shifting the position of said movable member, a stylus connected with said first mentioned lever, and a movable chart disposed adjacent the path of travel of said stylus.

4. In a shock recorder, the combination of a frame to be subjected to shocks, a lever pivotally connected with said frame, a stylus arm connected with said lever, a second lever pivotally connected to said first mentioned lever, a bar journaled to said second mentioned lever, and serving as a fulcrum for said second mentioned lever, and time-controlled mechanism for shifting said bar slowly in the general proximate direction of its own length.

5. In a shock recorder, the combination of a frame to be subjected to shocks, a lever pivotally mounted upon said frame, a stylus carried by said lever, a record chart disposed adjacent to said stylus and adapted to be marked with a record line thereby, an inertia-held weight mounted upon said second mentioned lever, the proportions of said levers being such that the movement of said frame relatively to said weight are of less amplitude than the movements of said stylus relatively to said record chart.

6. In a shock recorder, the combination of a frame to be subjected to shocks, an inertia-held weight carried by said frame and relatively to which said frame is movable, a recording device connected with said weight, and reducing gear connected with said weight and actuated thereby, said reducing gear being connected with said recording device for actuating the same.

7. In a shock recorder, the combination of a frame to be subjected to shocks, a lever pivotally mounted upon said frame, a second lever, a pivotal support therefor, said second lever pivotally secured to said first mentioned lever, a spring connected with said second mentioned lever, a weight carried by said second mentioned lever and normally balanced by the tension of said spring, a stylus carried by said first mentioned lever, and a record chart movable bodily in relation to said stylus.

8. In a shock recorder, the combination of a frame, a lever pivotally mounted within said frame, a stylus carried by said lever and actuated thereby for the purpose of marking a movable record chart, a second lever pivotally connected with said first mentioned lever, a spring connected with said second mentioned lever, a weight carried by said second mentioned lever and normally balanced by the tension of said spring, a bar connected with said first mentioned lever to different angular positions in order to move said stylus into different angular positions, and time-controlled mechanism for actuating said bar.

9. In a shock recorder, the combination of a pivotally mounted lever, a second lever pivotally connected with said first mentioned lever, a spring connected with said second mentioned lever, a weight carried by said second mentioned lever and normally maintaining said spring under tension, a rack bar connected with said second mentioned lever at a point adjacent the point where said second mentioned lever is mounted upon said first mentioned lever, a time-controlled gear member engaging said rack bar for the purpose of gradually moving said rack bar in the proximate general direction of its length in order to shift said first mentioned lever into different angular positions relatively to its point of support, and a stylus connected with said first mentioned lever and movable therewith into different angular positions.

10. In a shock recorder, the combination of a stylus for engaging a traveling record, a lever connected with said stylus for turning the same into different angular positions, a second lever pivotally mounted upon said first mentioned lever, a resilient member extending from said first mentioned lever to said second mentioned lever, and time-controlled mechanism connected with one of said levers for the purpose of shifting said first mentioned lever into different angular positions in order to shift said stylus into different positions.

11. In a shock recorder, the combination of a revoluble record chart, a lever disposed upon one side of said chart, an arm carried by said lever and extending partially around the peripheral edge of said chart, a stylus carried by said arm and engaging said chart, said stylus being located upon the side of said chart opposite said lever, a second lever connected with said first mentioned lever, a weight carried by said second mentioned lever, and time-controlled mechanism connected with said second mentioned lever for shifting said first mentioned lever and said stylus arm into different angular positions in order to affect the marking of said record chart by said stylus.

12. In a shock recorder, the combination of a revoluble record chart having the form of a disk, means for turning said chart, a stylus pivotally mounted at a point adjacent said record chart, time-controlled mechanism for turning said record chart and for gradually shifting said stylus to different angular positions upon its point of support, and a marker wheel mounted upon said stylus and having its plane disposed in a predetermined direction relative to the proximate direction of travel of said record chart relatively to said marker wheel.

13. In a device of the character described, the combination of a revoluble record chart, a marker wheel for engaging said chart, means for supporting said marker wheel in a plane obliquely crossing the direction of travel of said record chart relatively to said marker wheel at a point where said marker wheel engages said record chart, means for turning said record chart and for shifting said marker wheel bodily in relation to the general position of said record chart, and inertia-held mechanism for disturbing the position of said marker wheel relatively to said record chart.

14. In a device of the character described, the combination of a record chart, a stylus arm movable relatively to said record chart, time-controlled mechanism for turning said record chart and for shifting the position of said stylus arm relatively to the position of said record chart, a marker wheel revolubly mounted upon said stylus arm and engaging said record chart, the plane of said marker wheel obliquely crossing the path of travel of said record chart at the point where said record chart engages said marker wheel, a weight, and means for suspending said weight so as to render the latter sensitive to shocks.

15. In a device of the character described, the combination of recorder mechanism, a casing for containing the same, said casing being made in two parts detachably connected together, a punch located within said casing and controllable by movement of said parts relatively to each other as said parts are separated, and a record chart having a portion disposed adjacent said punch, to be operated upon by said punch when said parts of said casing are separated.

16. In a device of the character described, the combination of an inner casing, an outer casing, a recording member carried by said inner casing, punch mechanism for mutilating said recording member, said punch mechanism being controllable by movements of said outer casing relatively to said inner casing in the act of separating said outer casing from said inner casing, and mechanism for marking said recording member.

17. A device of the character described comprising an inner casing, an outer casing detachably connected with said inner casing, a revoluble record member carried by said inner casing, punch mechanism located within said inner casing and controllable by the disengagement of said outer casing from said inner casing, said record member having a portion extending adjacent said punch mechanism in order to be mutilated thereby when said punch mechanism is actuated, time-controlled mechanism for moving said record member relatively to said punch mechanism, and mechanism controllable by shocks for marking said record member.

Signed at New York, borough of Manhattan, in the county of New York and State of New York, this 30th day of April, A. D. 1914.

CHAUNCY W. NIEMAN.

Witnesses:
MARY B. JUSTICE,
GEORGE E. COOK.